United States Patent
Dong et al.

(10) Patent No.: US 12,430,746 B2
(45) Date of Patent: Sep. 30, 2025

(54) SLM PRINTING DEFECT DETECTION AND REPAIR METHOD AND SYSTEM BASED ON DEEP LEARNING NETWORK

(71) Applicant: Wuhan University, Hubei (CN)

(72) Inventors: Fang Dong, Wuhan (CN); Zihan Yang, Wuhan (CN); Xiangyu Lu, Wuhan (CN); Junlai Zhao, Wuhan (CN); Guoqing Zhang, Wuhan (CN); Yongzhen Jia, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 18/918,010

(22) Filed: Oct. 16, 2024

(65) Prior Publication Data
US 2025/0045899 A1 Feb. 6, 2025

(30) Foreign Application Priority Data
May 22, 2024 (CN) .......................... 202410636039.6

(51) Int. Cl.
G05B 19/048 (2006.01)
G06T 7/00 (2017.01)

(52) U.S. Cl.
CPC .......... *G06T 7/0004* (2013.01); *G05B 19/048* (2013.01); *G06T 2207/20081* (2013.01);
(Continued)

(58) Field of Classification Search
CPC ......... G06T 7/0004; G06T 2207/20081; G06T 2207/20088; G06T 2207/30144;
(Continued)

(56) References Cited

U.S. PATENT DOCUMENTS

| | | | |
|---|---|---|---|
| 10,921,782 B2 | 2/2021 | Mehr | |
| 2019/0118300 A1* | 4/2019 | Penny | .................. B23K 26/032 |
| 2021/0191363 A1* | 6/2021 | Mehr | ...................... B22F 10/85 |

FOREIGN PATENT DOCUMENTS

| | | | | |
|---|---|---|---|---|
| CN | 116352113 A | * | 6/2023 | ............. B22F 10/85 |
| CN | 119887768 A | * | 4/2025 | ............. G01N 21/95 |

* cited by examiner

*Primary Examiner* — Yuhui R Pan (57) ABSTRACT

The present invention discloses to a selective-laser-melting (SLM) printing defect detection and repair method and system based on a deep learning network and belongs to the technical field of additive manufacturing. The method includes: training a first neural network model through a defect dataset to obtain a defect recognition model; in a printing process of a part to be detected, performing online defect recognition through the defect recognition model; if a current layer has no defects, continuing to perform powder spreading and printing on a next layer; if a defect is recognized in the current layer, selecting whether to repair the defect according to a defect type; if defect repair is needed, after the current layer is printed, suspending powder spreading once, predicting laser remelting parameters by adopting a pre-trained second neural network model, and performing laser remelting repairing until the current layer has no defects; and repeating the processes of online defect recognition and laser remelting repair until the part to be detected is printed. In the present invention, the online defect recognition and repair are realized, and the real-time performance of the defect repair is improved.

8 Claims, 2 Drawing Sheets

(52) U.S. Cl.
CPC ............... *G06T 2207/20088* (2013.01); *G06T 2207/30144* (2013.01)

(58) Field of Classification Search
CPC ......... G06T 2207/20084; G05B 19/048; Y02P 10/25; B22F 10/85; B22F 10/28; B22F 10/31; B22F 12/00; B22F 12/90; B33Y 10/00; B33Y 30/00; B33Y 40/00; B33Y 50/02; G06N 3/045; G06N 3/0464; G06N 3/08
See application file for complete search history.

SLM PRINTING DEFECT DETECTION AND REPAIR METHOD AND SYSTEM BASED ON DEEP LEARNING NETWORK

TECHNICAL FIELD

The present invention belongs to the technical field of additive manufacturing, and specifically relates to a selective-laser-melting (SLM) printing defect detection and repair method based on a deep learning network.

BACKGROUND ART

Additive manufacturing (AM) is a process of manufacturing a three-dimensional object by stacking materials layer by layer. Metal additive manufacturing offers a possibility of manufacturing complex and delicate parts through the high-precision metal selective laser melting (SLM) printing technology. This technology uses a laser to precisely melt metal powder, stack it layer by layer, and finally construct desired parts. However, due to its layer-by-layer stacking feature, various defects such as pores, cracks, splashes, and deformation, may occur during an additive manufacturing process. These defects are often caused by a variety of factors such as material features, printing parameters, and system settings, which may seriously affect the performance and service life of the products. Therefore, it is of great practical significance to develop a method and system that can detect defects in the additive manufacturing process in real time and repair the defects.

Existing additive manufacturing detection algorithms are classified into two categories: online detection and offline detection. To be specific, the offline detection refers to detection and evaluation after the completion of SLM printing. The shape, size, density, porosity, crack, phase composition, grain size, hardness, strength, etc. of SLM formed parts can be detected and analyzed offline by using an X-ray, an ultrasonic wave, a microscope, a stretching machine and other instruments, so as to obtain information such as geometric precision, structural integrity, material properties, and thermodynamic properties of the SLM formed parts. The disadvantages of the offline detection are that: the SLM process needs to be stopped or interrupted, which affects the continuity and efficiency of the SLM process; a lot of manual operations and interventions are needed, which affects the automation and standardization of the SLM process; in addition, differences between a device state after a power outage and an operating state needs to be considered and eliminated, which affects the consistency and stability of the SLM process.

The online detection may realize comprehensive and continuous monitoring of the SLM process, thus improving the traceability and controllability of the SLM process. Existing online monitoring methods mainly include defect detection methods based on image processing and defect detection methods based on sensors, but most of these online detection methods can only detect defects, but cannot repair defects, and cannot meet the needs of online detection in terms of a real-time performance and accuracy, thus affecting improvement of the quality of the SLM formed parts.

SUMMARY

In view of this, the present invention proposes an SLM printing defect detection and repair method based on a deep learning network, which is used to solve a problem that the existing SLM printing defect online detection methods cannot repair defects.

In a first aspect the present invention discloses an SLM printing defect detection and repair method based on a deep learning network, including:
- S1, acquiring a molten pool image in an SLM printing process, preprocessing the molten pool image, and making a defect dataset according to a defect type;
- S2, training a first neural network model through the defect dataset to obtain a defect recognition model for recognizing a defect and determining a defect type;
- S3, in a printing process of a part to be detected, acquiring a molten pool image of the part to be detected in real time, and performing online defect recognition through the defect recognition model;
  if a current layer has no defects, S4 is performed;
  if a defect is recognized in the current layer, selecting whether to repair the defect according to a defect type; and
  if defect repair is required, after the current layer is printed, suspending powder spreading once, predicting laser remelting parameters by adopting a pre-trained second neural network model, and performing laser remelting repairing on the defect by adopting the laser remelting parameters until the current layer has no defects; and
- S4, continuing to perform powder spreading and printing on a next layer, returning to S3, repeating the process of online defect recognition and laser remelting repair until the part to be detected is printed.

On the basis of the above technical scheme, preferably, the defect types include a short crack, a pore, a deformation, and a long crack, wherein the short crack and the pore belong to common defects, and the deformation and the long crack belong to serious defects.

The defect dataset is obtained by marking a defect position and the defect type of the preprocessed molten pool image.

On the basis of the above technical scheme, preferably, a network structure of the first neural network model is as follows: an input layer, a convolutional downsampling layer, a first cross stage partial network (CSPNet) enhanced module, a second CSPNet enhanced module, a third CSPNet enhanced module, a fourth CSPNet enhanced module, a self-attention module, an efficient long-range attention network (ELAN) enhanced module, a first splicing layer, a fifth CSPNet enhanced module, a second splicing layer, a small object detection module, an eighth CSPNet enhanced module, a fifth splicing layer, a ninth CSPNet enhanced module, a sixth splicing layer, a reparameterization CSPNet enhanced layer, and an output layer which are connected successively.

The first CSPNet enhanced module, the second CSPNet enhanced module, the third CSPNet enhanced module, and the fourth CSPNet enhanced module each include a convolutional downsampling layer and a reparameterization CSPNet enhanced layer which are connected successively.

The ELAN enhanced module includes a spatial pyramid pooling ELAN enhanced layer and an upsampling layer which are connected successively.

The first splicing layer is used to splice an output of the third CSPNet enhanced module with an output of the ELAN enhanced module, and input a splicing result into the fifth CSPNet enhanced module.

The second splicing layer is used to splice an output of the second CSPNet enhanced module to an output of the fifth CSPNet enhanced module, and input a splicing result into the small object detection module.

The small object detection module includes a sixth CSPNet enhanced module, a third splicing layer, a seventh CSPNet enhanced module, and a fourth splicing layer which are connected successively. The third splicing layer is used to splice an output of the first CSPNet enhanced module to an output of the sixth CSPNet enhanced module, and input a splicing result into the seventh CSPNet enhanced module. The fourth splicing layer is used to splice the output of the sixth CSPNet enhanced module to an output of the seventh CSPNet enhanced module, and input a splicing result into the eighth CSPNet enhanced module.

The fifth CSPNet enhanced module and the sixth CSPNet enhanced module each include a reparameterization CSPNet enhanced layer and an upsampling layer which are connected successively.

The seventh CSPNet enhanced module and the eighth CSPNet enhanced module each include a reparameterization CSPNet enhanced layer and a convolutional downsampling layer which are connected successively.

The fifth splicing layer is used to splice an output of the reparameterization CSPNet enhanced layer of the fifth CSPNet enhanced module to an output of the eighth CSPNet enhanced module, and input a splicing result into the ninth CSPNet enhanced module.

The sixth splicing layer is used to splice the spatial pyramid pooling ELAN enhanced layer of the ELAN enhanced module to the ninth CSPNet enhanced module.

On the basis of the above technical scheme, preferably, the self-attention module adopts a windowed self-attention mechanism or a shifted windowed multihead self-attention mechanism.

On the basis of the above technical scheme, preferably, the step of selecting whether to repair a defect according to a defect type if the defect is recognized in the current layer specifically includes:

acquiring a defect type of each defect and a corresponding defect confidence level output by the defect recognition model;

if the defect type contains a serious defect, directly ending printing;

if all defect types are common defects, computing final defect confidence levels of the common defects:

$FCL = w \times N + (1-w) \times M$ wherein FCL is a final defect confidence level, w is a weight, $w \in [0, 1]$, N is an average of defect confidence levels corresponding to pore defects, and M is an average of defect confidence levels corresponding to short crack defects; and judging whether the final defect confidence level is greater than a preset confidence level threshold, if so, selecting to repair the defect, and otherwise, continuing to perform powder spreading and printing on a next layer.

On the basis of the above technical scheme, preferably, the training process of the second neural network model is as follows:

step a, increasing laser power and reducing a scanning speed on the basis of standard printing parameters to obtain a plurality of groups of adjusted laser printing parameters;

step b, performing a plurality of defect recognition and remelting repair experiments, wherein the process of each experiment is as follows:

step b1, judging whether the current layer has a defect through the defect recognition model, and if not, performing step c; and if so, recording a current defect type and a corresponding final defect confidence level as a defect type and a final defect confidence level FCL1 before the repair;

step b2, if the final defect confidence level FCL1 before the repair exceeds a preset confidence level threshold, suspending powder spreading once, selecting one group of adjusted laser printing parameters to perform a laser remelting repair, computing a final defect confidence level FCL2 after the repair, and computing a confidence level change speed V according to the final defect confidence levels before and after the repair, wherein $V = (FCL1 - FCL2)/t$, t is a time interval; and step b3, returning to step b1, repeating the processes of defect recognition and remelting repair until the current layer has no defects;

step c, continuing to perform printing on a next layer, and repeating the defect recognition and remelting repair experiments in the step b until each group of adjusted laser printing parameters is used at least once;

step d, screening effective data with the confidence level change speed V greater than a preset speed threshold from the plurality of groups of adjusted laser printing parameters, and constructing a repair dataset by using the final defect confidence level FCL1 and the confidence level change speed V before the repair of each group of effective data as sample characteristics and the adjusted laser printing parameters as sample labels; and step e, training the second neural network model through the repair dataset to obtain a defect repair model.

On the basis of the above technical scheme, preferably, the step of predicting laser remelting parameters by adopting the pre-trained second neural network model, and performing the laser remelting repair on a defect by adopting the laser remelting parameters until the current layer has no defects specifically includes:

step A, acquiring a defect type of the current layer and a corresponding final defect confidence level, and setting an initial confidence level change speed;

step B, inputting the final defect confidence level and the confidence level change speed into the defect repair model, and outputting laser remelting parameters;

step C, performing laser remelting repair once on the defect of the current layer by adopting the laser remelting parameters;

step D, collecting and inputting the molten pool image after the repair obtained at step C into the defect recognition model, judging whether a defect exists, and if not, ending the process of laser remelting repair; and if so, acquiring the final defect confidence level after the repair, and updating the confidence level change speed; and step E, returning to step B, and repeating the processes of laser remelting repair and online defect recognition until the defect recognition model recognizes that the current layer has no defects.

In a second aspect the present invention discloses an SLM printing defect detection and repair system based on a deep learning network, wherein the system comprises:

a model training module: configured to collect a molten pool image in an SLM printing process, preprocess the molten pool image, and make a defect dataset according to a defect type and configured to train a first neural network model through the defect dataset to obtain a defect recognition model;

a defect recognition module: configured to collect, in a printing process of a part to be detected, a molten pool image in real time, and perform online defect recognition through the defect recognition model; and continue to perform powder spreading and printing on a next layer if the current layer has no defects;

a defect repair module: configured to select, if a defect is recognized, whether to repair the defect according to a defect type; and suspend, if defect repair is required, powder spreading once after the current layer is printed, predict laser remelting parameters by adopting a pretrained second neural network model, perform laser remelting repairing on the defect by adopting the laser remelting parameters until the current layer has no defects, and continue to perform powder spreading and printing on a next layer; and a cyclic printing module: configured to enable the defect recognition module and the defect repair module to work repeatedly until the part to be detected is printed.

In a third aspect the present invention discloses an electronic device, including: at least one processor, at least one memory, a communication interface, and a bus, wherein the processor, the memory, and the communication interface complete communications with one another through the bus;

the memory stores a program instruction that can be executed by the processor, and the processor invokes the program instruction to realize the method described in the first aspect of the present invention.

In a fourth aspect the present invention discloses a computer readable storage medium being capable of storing computer instructions, and the computer instructions enable a computer to implement the method described in the first aspect of the present invention.

Compared with the prior art, the present invention has the following beneficial effects:

1) In the present invention, the defect recognition model is constructed by training the first neural network model. In the printing process of each layer, online defect recognition is performed through the real-time molten pool image; after the defect is recognized, the laser remelting parameters are predicted by adopting the pre-trained second neural network model, laser remelting repairing is performed on the defect by adopting the laser remelting parameters, so that online defect repairing is realized, and the real-time performance of defect repair is improved.

2) The first neural network model of the present invention utilizes the plurality of CSPNet enhanced modules and the ELAN enhanced module to extract and splice characteristics at a deep level. Aiming at a problem that it is difficult to learn characteristic information of a small object in a deeper characteristic map, the present invention adds a small object detection layer to splice a shallow-level characteristic map and the deep-level characteristic map, so that a network pays more attention to detection of the small object, and thus defects such as a smaller pore may be recognized; therefore, a detection effect may be improved, and the probability of defect missed detection is reduced.

3) In the present invention, because of introduction of the windowed self-attention mechanism or the shifted windowed multihead self-attention mechanism into the first neural network model, the parallel computing ability is improved and thus characteristic representations of different subspaces can be learned simultaneously and information can be transmitted, so as to allow the model to learn a wider range of contextual information; and thus the first neural network model can learn rich characteristic representations while maintaining an efficient computing performance, thereby improving a prediction performance of the model.

4) In the present invention, the repair dataset is constructed by screening the effective data with the confidence level change speed greater than the preset speed threshold through the plurality of defect recognition and remelting repair experiments, so as to train the second neural network model to obtain the defect repair model. The laser remelting parameters may be predicted according to the final defect confidence level of the current layer and the confidence level change speed during the repair process. That is, the laser remelting parameters of the next repair may be adjusted in time according to a current defect situation and a previous repair effect to perform laser remelting repair on the defect until the current layer has no defects, which improves the repair efficiency.

BRIEF DESCRIPTION OF DRAWINGS

In order to explain technical schemes in embodiments of the present invention or the prior art more clearly, accompanying drawings that need to be used in descriptions of the embodiments or the prior art will be briefly introduced below. It shall be obvious that the accompanying drawings in the following descriptions are only some embodiments of the present invention, and those of ordinary skill in the art can obtain other accompanying drawings based on the accompanying drawings without involving any inventive efforts.

DETAILED DESCRIPTION OF EMBODIMENTS

Technical schemes in embodiments of the present invention will be clearly and completely described below in combination with the embodiments of the present invention. It shall be obvious that the described embodiments are only part, instead of all, of the embodiments of the present invention. Based on the embodiments in the present invention, all other embodiments obtained by those of ordinary skill in the art without involving any inventive efforts shall fall within the protection extent of the present invention.

Figure 1:
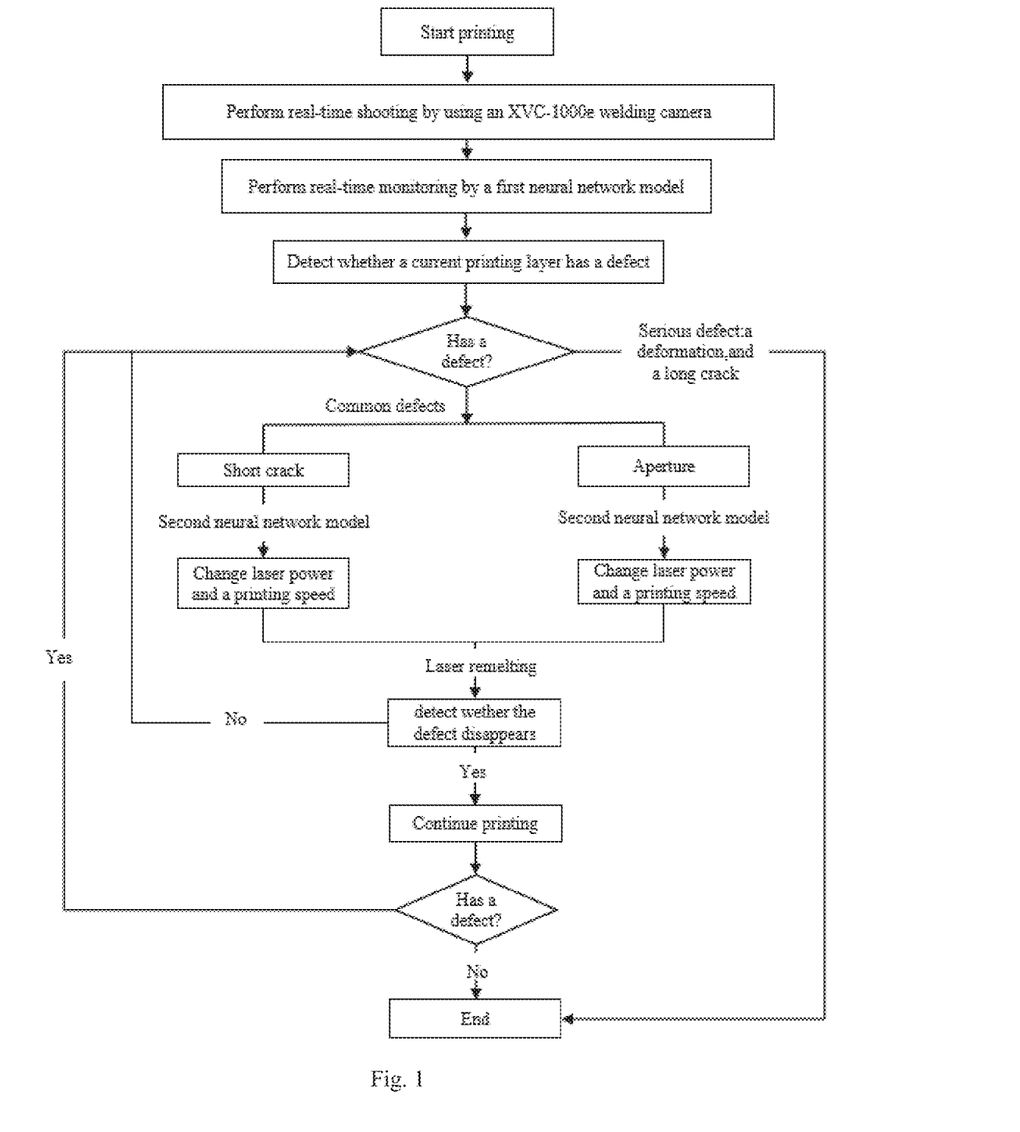
FIG. 1 is a flowchart of an SLM printing defect detection and repair method based on a deep learning network of the present invention.

With reference to FIG. 1, the present invention proposes an SLM printing defect detection and repair method based on a deep learning network, wherein the method includes that:

S1, a molten pool image in an SLM printing process is acquired, the molten pool image is preprocessed, and a defect dataset is made according to a defect type.

In the embodiment, a PHOTRONs9 high-speed camera is adopted to shoot a molten pool, a shooting frame rate is set to 10,000 fps, and a shutter speed is set to $\frac{1}{20000}$ second.

Since many unusable images may be generated in high-speed shooting, and noise points may appear in the images, the acquired molten pool images need to be preprocessed.

Specifically, the unusable and fuzzy molten pool images are eliminated by manual screening, and then a Gaussian filter is used to denoise the molten pool images. In a denoising process, a filter kernel ksize is set to 3×3, label differences sigmaX and sigmaY in a horizontal direction and a vertical direction of a convolution kernel are both set to 0, and a border type borderType is set to a default value of 0.

In this case, a denoising effect of the processed images is improved, and the resolution of the molten pool images will not be reduced much.

Finally, the molten pool images are labeled by Labelimg software, and positions and types of defects are selected with boxes in the molten pool images to construct the defect dataset. In the present invention, the defects are classified into defect-free, common-defect, and serious-defect types. The common defects include a short crack and a pore, and the serious defects include a deformation and a long crack. Therefore, label types of the defect dataset constructed by the present invention are divided into defect-free, pore, short-crack, long-crack, and deformation categories, wherein the short crack refers to a crack with length less than a preset length threshold, and the long crack refers to a crack with length greater than or equal to a preset length threshold.

A labeling file of the defect dataset of the present invention is in a txt format, which includes the defect types, coordinates of a center point, and a length and width of a labeling box. These coordinates are normalized values relative to widths and heights of the images, so as to ensure that the images of different sizes may be trained with the same labeling data. There are a total of 3,493 labeled images, and a series of data enhancement means including shape, size, angle change, horizontal flipping, mosaic data enhancement, etc., are used to perform data amplification processing on the dataset to improve the network robustness and defect recognition precision of. The expanded dataset has 10,000 images and is divided into a training set, a verification set, and a test set according to a ratio of 7:1:2; the training set is used to train a model and adjust a weight, the validation set is used to verify the performance of the model and adjust hyperparameters during a training process, and the test set is used to evaluate the final performance of the model after the model is trained.

S2, a first neural network model is trained through the defect dataset to obtain a defect recognition model for recognizing a defect and determining a defect type.

Figure 2:
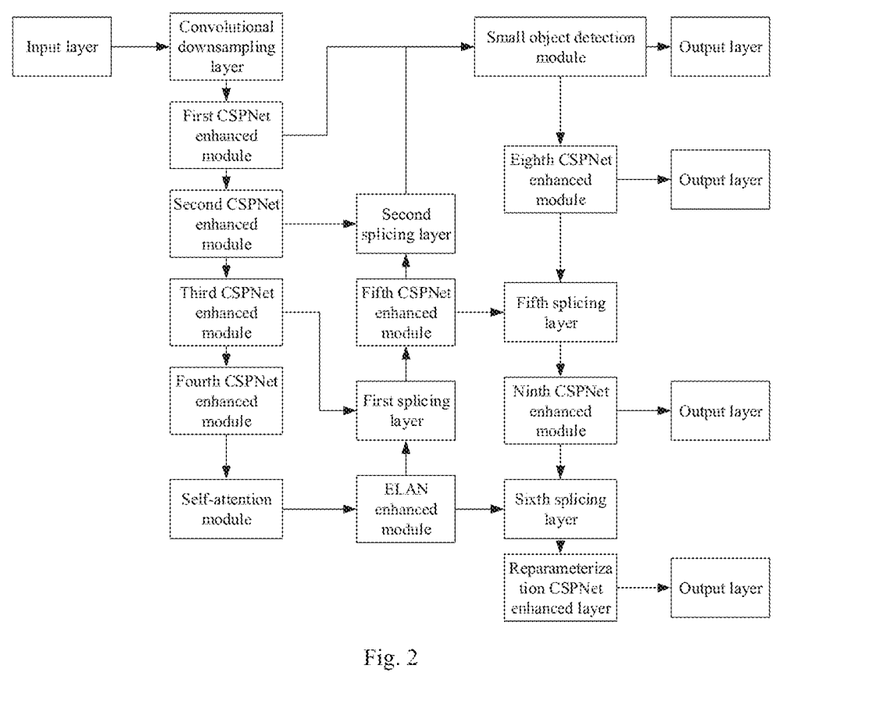
FIG. 2 is a schematic structural diagram of a first neural network model of the present invention.

As is shown in FIG. 2, a network structure of the first neural network model adopted by the present invention is as follows: an input layer, a convolutional downsampling layer, a first CSPNet enhanced module, a second CSPNet enhanced module, a third CSPNet enhanced module, a fourth CSPNet enhanced module, a self-attention module, an ELAN enhanced module, a first splicing layer, a fifth CSPNet enhanced module, a second splicing layer, a small object detection module, an eighth CSPNet enhanced module, a fifth splicing layer, a ninth CSPNet enhanced module, a sixth splicing layer, a reparameterization CSPNet enhanced layer, and an output layer which are connected successively.

The first CSPNet enhanced module, the second CSPNet enhanced module, the third CSPNet enhanced module, and the fourth CSPNet enhanced module each include a convolutional downsampling layer and a reparameterization CSPNet enhanced layer which are connected successively. The reparameterization CSPNet enhanced layer is a RepNCSPELAN4 block used to improve the learning ability and efficiency of the network.

The self-attention module adopts a windowed self-attention mechanism or a shifted windowed multihead self-attention mechanism.

Window self-attention (WSA) carries out independent computation of attention within each window, which reduces the computing load as well as maintains sensitivity to local characteristics. An attention computational formula for the WSA is as follows:

$$\text{Attention}(Q, K, V) = \text{Softmax}\left(\frac{QK^T}{\sqrt{d_k}} + B\right)V$$

wherein Q, K, and V represent a query matrix, a key matrix, and a value matrix respectively, $d_k$ represents a dimension of a key K, B is a deviation matrix computed according to a relative position in the window, and Softmax is a normalization function.

In order to allow the interaction of information between different windows, the shifted windowed self-attention (SWSA) mechanism may be further adopted, which position shifts of the windows are caused between all stages, so that self-attention may also be computed between adjacent windows to realize information transmission of and thus the model can learn a wider range of contextual information. If self-attention computations are performed directly on all small pieces of a whole image, the high computation load will be caused, and some details may also be overlooked. The computation process of the SWSA is similar to that of the WSA, but before computation, the window moves a certain number of pixels in one direction of the image. A multihead attention mechanism is used to process information in parallel, and each head learns characteristic representations of different subspaces. The computation of multihead attention (MultiHead) may be expressed as:

$$\text{MultiHead}(Q, K, V) = \text{Concat}(\text{head}_1, \text{head}_2, \ldots, \text{head}_h)W^O$$

wherein each head $\text{head}_i$ is a separate attention function, i=1, 2, . . . , h, h is the number of heads, $W^O$ is a projection matrix, and Concat is a splicing function.

The ELAN enhanced module includes a spatial pyramid pooling ELAN enhanced layer and an upsampling layer which are connected successively.

The spatial pyramid pooling ELAN enhanced layer is a spatial pyramid pooling enhanced layer attention network (SPPELAN) block that is used to capture characteristics at different scales.

The first splicing layer is used to splice an output of the third CSPNet enhanced module to an output of the ELAN enhanced module, and input a splicing result into the fifth CSPNet enhanced module.

The second splicing layer is used to splice an output of the second CSPNet enhanced module to an output of the fifth CSPNet enhanced module, and input a splicing result into the small object detection module.

The small object detection module includes a sixth CSPNet enhanced module, a third splicing layer, a seventh CSPNet enhanced module, and a fourth splicing layer which are connected successively. The third splicing layer is used to splice an output of the first CSPNet enhanced module to an output of the sixth CSPNet enhanced module, and input a splicing result into the seventh CSPNet enhanced module. The fourth splicing layer is used to splice the output of the sixth CSPNet enhanced module to an output of the seventh CSPNet enhanced module, and input a splicing result into the eighth CSPNet enhanced module.

The fifth CSPNet enhanced module and the sixth CSPNet enhanced module each include a reparameterization CSPNet enhanced layer and an upsampling layer which are connected successively.

The seventh CSPNet enhanced module and the eighth CSPNet enhanced module each include a reparameterization CSPNet enhanced layer and a convolutional downsampling layer which are connected successively.

The fifth splicing layer is used to splice an output of the reparameterization CSPNet enhanced layer of the fifth CSPNet enhanced module to an output of the eighth CSPNet enhanced module, and input a splicing result into the ninth CSPNet enhanced module.

The sixth splicing layer is used to splice the spatial pyramid pooling ELAN enhanced layer of the ELAN enhanced module to the ninth CSPNet enhanced module.

The output layer is used to output information including defect existence determination, defect types and corresponding defect confidence levels.

The first neural network model of the present invention utilizes the plurality of CSPNet enhanced modules and the ELAN enhanced module to extract and splice deep-level characteristics. In order to solve a problem that it is difficult to learn characteristic information of a small object in a deeper characteristic map, the present invention adds a small object detection layer to splice a shallow-level characteristic map to the deep-level characteristic map, so that the network pays more attention to detection of the small object, thus defects such as a smaller pore may be recognized; therefore, the detection effect may be improved, and a probability of defect missed detection is reduced.

In addition, in the present invention, because of introduction of the windowed self-attention mechanism or the shifted windowed multihead self-attention mechanism into the first neural network model, the parallel computing ability is improved and thus characteristic representations of different subspaces can be learned simultaneously and information can be transmitted, so as to enable the model to learn a wider range of contextual information; and thus the first neural network model can learn rich characteristic representations while maintaining an efficient computing performance, thereby improving the prediction performance of the model The present invention sets corresponding training parameters, training is performed on the first neural network model shown in FIG. 2, and the set training parameters include:

an initial learning rate (lr0) that is a learning rate at the beginning of training and is set to 0.01; a learning rate end factor (lrf) that is used to compute a learning rate at the end of training and is set to 0.01; a momentum optimization parameter (momentum) that helps to ensure the speed of gradient descent in a correct direction and is set to 0.937; a weight decay that is used for regularization and overfitting prevention and is set to 0.0005; epochs during a warmup period (warmup_epochs), during which period the learning rate gradually increases to lr0, and which is set to 3.0; a momentum value during the warm-up period (warmup_momentum) that is set to 0.8; a bias learning rate during the warm-up period (warmup_bias_lr) that is set to 0.1; a weight (box) of an object box loss, which controls a proportion of the object box loss in a total loss and is set to 7.5; a weight (cls) of a category loss, which controls a ratio of the category loss to the total loss and is set to 0.5; a weight factor (cls_pw) of the category loss, which is used to balance influences of positive and negative samples in an object loss and is set to 1.0; a weight (obj) of the object loss, which controls a proportion of the object loss in the total loss and is set to 0.7; a weight factor (obj_pw) of the target loss, which is used to balance the influences of the positive and negative samples in the object loss and is set to 1.0; a weight (dfl) of a distributed focus loss, which is used to control a proportion of the distributed focus loss in the total loss and is set to 1.5; an intersection-of-union threshold (iou_t) that is used for target box filtering during training and is set to 0.2; an anchor threshold (anchor_t) that is used to select a best anchor point and is set to 5.0; and a gamma parameter of Focal Loss (fl_gamma), which is used to reduce a weight of easily classifying samples and is set to 0.0.

In addition, in order to improve the training effect, relevant parameters of data enhancement are set to perform the data enhancement during the training process, so as to help the model have access to more changing data during training, thus improving the generalization ability of the model.

The present invention trains the first neural network model based on the windows11 system, Pycharm is used as a compiler, i9-10980XE of Inter is used, a NVIDIA Geforce RTX A6000 graphics card is adopted as a graphics card, batch-size is set to 16, and epochs of training is set to 300.

In addition, in order to improve the generalization ability of the model, the defect dataset may also be made by collecting multi-times experimental data according to actual needs, which mainly covers three different defect recognition conditions: the first condition only having short cracks as defects, the second condition only having pores as defects, and the third condition having cracks and pores as defects, so as to ensure the universality of final training results.

S3, in a printing process of a part to be detected, the molten pool image is collected in real time, and online defect recognition is performed through the defect recognition model; if a current layer has no defect, the S4 is performed; if a defect is recognized in the current layer, whether to repair the defect is selected according to a defect type; and if so, after the current layer is printed, powder spreading is suspended once, laser remelting parameters are predicted by adopting a pre-trained second neural network model, and a laser remelting repair is performed on the defect by adopting the laser remelting parameters until the current layer has no defects.

The S3 specifically includes the following steps:

S31, if the current layer has no defect, S4 is performed.

S32, if a defect is recognized in the current layer, whether to repair the defect is selected according to the defect type.

Specifically, the S32 includes the following steps:

S321, the defect type of each defect and a corresponding defect confidence level output by the defect recognition model are acquired.

S322, if the defect types contain a serious defect, printing is directly ended.

S323, if all defect types are common defects, final defect confidence levels of the common defects are computed, $$FCL = w \times N + (1 - w) \times M$$

wherein FCL is a final defect confidence level, w is a weight, w∈ [0, 1], N is an average of defect confidence levels corresponding to pore defects in common defects, and M is an average of defect confidence levels corresponding to short crack defects in the common defects.

The first neural network model may recognize defects at a speed of 60 frames per second; because of the high recognition speed, confidence levels of the defects in the molten pool image also constantly change, so starting from recognition of one or two types of defects, the defect confidence levels of pore defects are recorded as n1, n2 . . . respectively, the defect confidence levels of short crack defects are recorded as m1, m2 . . . respectively, and the sum of the defect confidence levels of each of the two kinds of defects is counted respectively. At the end of printing of the current layer, an average of the defect confidence levels of each of the two types of defects is computed respectively. The average of the defect confidence levels corresponding to the pore defects is recorded as N. The average of the defect confidence levels corresponding to the short crack defects is recorded as M. Due to the different effects of different defects on a structure of a printed part, a weight of the pore defects may be set to w=0.4, a weight of the short crack defects may be set to 1−w=0.6, and after multiplying the weights by the averages of the corresponding defect confidence levels respectively, a value obtained by adding the multiplying results is used as the final defect confidence level of the current layer, which is recorded as FCL.

S324, whether the final defect confidence level is greater than a preset confidence level threshold is judged, if so, repairing the defect is chosen, and the S33 is performed. Otherwise, S4 is performed to continue to perform powder spreading and printing on a next layer, wherein the value range of the preset confidence level threshold is (0.3, 1) and the preferable preset confidence level threshold, in the embodiment, is 0.7.

S33, if the defect is repaired, after the current layer is printed, powder spreading is suspended once, laser remelting parameters are predicted by adopting the pre-trained second neural network model, and laser remelting repairing is performed on the defect by adopting the laser remelting parameters until the current layer has no defects.

The S33 specifically includes the following steps:

S331, the second neural network model is pre-trained.

A multilayer perceptron (MLP) is adopted as the second neural network model of the present invention. The training process of the second neural network model is as follows:

step a, laser power is increased and a scanning speed is reduced on the basis of standard printing parameters to obtain a plurality of groups of adjusted laser printing parameters.

Excessive laser power may cause an edge overflow phenomenon, and the standard printing parameters are set as: the laser power is 200 W and the scanning speed is 1,000 mm/s. The adjusted laser printing parameters are obtained.

In the present invention, laser remelting is performed by changing the laser power and scanning speed; specifically, the laser power and scanning speed are adjusted on the basis of the standard printing parameters to obtain the plurality of groups of adjusted laser printing parameters. Because, in general, increasing the scanning speed and reducing the laser power increase the number of cracks and pores, the combination of reducing the scanning speed and increasing the laser power may be prioritized; but too small scanning speed also increases the porosity and cracks, and affects the printing speed, too large laser power leads to the edge overflow phenomenon, so it is necessary to set the printing parameters and adjust the amplitude according to the actual situation. When the laser power is set to 200 W and the scanning speed is 1,000 mm/s, the increase of the laser power does not exceed 50 W, and the decrease of the scanning speed does not exceed 200 mm/s, and the adjustment amplitude should be set to 5 W and 20 mm; there are totally 10 different power settings and 10 different scanning speeds, and 100 combinations (10×10=100) are obtained.

step b, defect recognition and remelting repair experiments are performed multiple times, and experimental parameters during each experiment are recorded, including: an experiment number, a timestamp, power setting, speed setting, and a confidence level change speed V. The process of each experiment is as follows:

step b1, whether the current layer has a defect is determined through the defect recognition model, and if not, step c is performed; and if so, a current defect type and a corresponding final defect confidence level are recorded as a defect type and a final defect confidence level FCL1 before the repair;

step b2, if a final defect confidence level FCL1 before the repair exceeds a preset confidence level threshold, powder spreading is suspended once, one group of adjusted laser printing parameters is selected to perform a laser remelting repair, a final defect confidence level FCL2 after the repair is computed, and a confidence level change speed V is computed according to the final defect confidence levels before and after the repair:

$$V = (FCL1 - FCL2)/t$$

wherein t is a time interval, and the time interval t is defined as time between the end of printing of the current layer and the recognition of 50 frames of molten pool images after the end of laser remelting.

step b3, the step b1 is performed again, the processes of the defect recognition and the remelting repair are repeated until the current layer has no defects;

step c, the next layer of printing continues to be performed, and the defect recognition and remelting repair experiments in the step b are repeated until each group of adjusted laser printing parameters is used at least once;

step d, effective data with the confidence level change speed V greater than a preset speed threshold are screened from the plurality of groups of adjusted laser printing parameters, and a repair dataset is constructed by using the final defect confidence level FCL1 and the confidence level change speed V before the repair of each group of effective data as sample characteristics, and the adjusted laser printing parameters as sample labels, wherein the value of the preset speed threshold is (0, 0.1) and the preferable preset speed threshold, in the embodiment, is 0.05; and step e, the second neural network model is trained through the repair dataset to obtain a defect repair model.

Training parameters of the second neural network model are set as follows:

Input_dim=2, dimensions of input variables, i.e., the final defect confidence level FCL and the confidence level change speed V;

Output_dim=2, dimensions of output variables, i.e., the laser power and the scanning speed;

Epochs=300, the epochs of training, set to 300 epochs;

Batch_size=16, the size of a training batch;

Lr=0.01, the magnitude of the learning rate;

L1_reg=0.00, L2_reg=0.0001, a coefficient before a regularization term;

Activation="relu", a nonlinear activation function that may help the model learn a nonlinear relationship, wherein a mathematical expression is:

$$f(x) = \begin{cases} 0, & x \leq 0 \\ x, & x > 0 \end{cases}$$

when an input value x is greater than zero, an output f(x) is equal to the input value; when the input value x is less than or equal to zero, an output is zero;

Loss="mse", a loss function, i.e., a mean square error, with a mathematical formula:

$$MSE = \frac{1}{n}\sum_{i=1}^{n}(y_i - \hat{y}_i)^2)$$

wherein MSE represents the mean square error; n represents the number of samples; $y_i$ represents a true value of an $i^{th}$ sample; and $\hat{y}_i$ represents a predicted value of the $i^{th}$ sample;

the number of neurons in a hidden layer N_hidden=500;

Optimidzer="Adam"; and evaluation metrics (Metrics)=["mae"], i.e. a mean absolute error.

S332, the laser remelting parameters are predicted by adopting the pre-trained second neural network model, and the laser remelting repair is performed on the defect by adopting the laser remelting parameters until the current layer has no defects. Specifically, the S332 includes:

Step A, a defect type of the current layer and a corresponding final defect confidence level are obtained, and an initial confidence level change speed V is set;

step B, the final defect confidence level and the confidence level change speed V are input into the defect repair model, and the laser remelting parameters are output;

step C, laser remelting repairing is carried out on the defect of the current layer once by adopting the laser remelting parameters;

step D, the molten pool image after the repair of step C is collected and input into the defect recognition model, whether a defect exists is judged; if not, the process of the laser remelting repair is ended; if so, the final defect confidence level after the repair is acquired, the confidence level change speed V' is computed, and the confidence level change speed of step A is updated by adopting the final defect confidence level after the repair, i.e., V=V'; and step E, step B is implemented, and the processes of the laser remelting repair and the online defect recognition are repeated until the defect recognition model recognizes that the current layer has no defects.

In the present invention, the repair dataset is constructed by screening the effective data with the confidence level change speed greater than the preset speed threshold through the plurality of defect recognition and remelting repair experiments, so as to train the second neural network model to obtain the defect repair model. The laser remelting parameters may be predicted according to the final defect confidence level of the current layer and the confidence level change speed during the repair process. That is, the laser remelting parameters of the next repair may be adjusted in time according to a current defect situation and a previous repair effect, so that laser remelting repair is performed on the defect until the current layer has no defects, which may improve the repair efficiency.

S4, powder spreading and printing are carried out continuously on a next layer, the S3 is performed again, the processes of online defect recognition and laser remelting repair are repeated until the part to be detected is printed.

Corresponding to the above method embodiment, the present invention further provides an SLM printing defect detection and repair system based on a deep learning network, wherein the system comprises:

a model training module: configured to collect a molten pool image in an SLM printing process, preprocess the molten pool image, and make a defect dataset according to a defect type; and configured to train a first neural network model through the defect dataset to obtain a defect recognition model;

a defect recognition module: configured to collect, in a printing process of a part to be detected, the molten pool image in real time, and perform online defect recognition through the defect recognition model; if a current layer has no defects, continuing to perform powder spreading and printing on a next layer;

a defect repair module: configured to select, if a defect is recognized, whether to repair the defect according to a defect type; and suspend, if the defect is repaired, powder spreading once after the current layer is printed, predict laser remelting parameters by adopting a pre-trained second neural network model, perform a laser remelting repair on the defect by adopting the laser remelting parameters until the current layer has no defects, and continue to perform powder spreading and printing on a next layer; and a cyclic printing module: configured to enable the defect recognition module and the defect repair module to work repeatedly until the part to be detected is printed.

The foregoing system embodiment and the method embodiment are in one-to-one correspondence, and the brief description of the system embodiment may refer to the method embodiment.

The present invention further discloses an electronic device, including: at least one processor, at least one memory, a communication interface, and a bus. The processor, the memory, and the communication interface complete communications with one another through the bus. The memory stores a program instruction that can be executed by the processor, and the processor invokes the program instruction to realize the foregoing method of the present invention.

The present invention further discloses a computer readable storage medium capable of storing computer instructions enabling a computer to implement all or part of the steps of the method described in the embodiment of the present invention. The storage medium includes: various media such as a U disk, a mobile hard disk, a read-only memory (ROM), a random access memory (RAM), a magnetic disk or an optical disc that may store program codes.

The system embodiment described above is only schematic, wherein units described as detached parts may be or may not be physically separated, and parts shown as units may be or may not be physical units, that is, they may be distributed onto a plurality of network units. Those ordinarily skilled in the art may select some or all of the modules therein according to actual needs to realize the purpose of the scheme of the embodiment without involving any inventive work.

The foregoing description is only preferred embodiments of the present invention, rather than limitation of the present invention, and any modification, equivalent replacement, improvement, etc. made within the spirit and principle of the present invention shall be contained in the protection extent of the present invention.

What is claimed is:

1. A selective-laser-melting (SLM) printing defect detection and repair method based on a deep learning network, the method comprising:

S1, acquiring a molten pool image in an SLM printing process, preprocessing the molten pool image, and making a defect dataset according to a defect type;

S2, training a first neural network model through the defect dataset to obtain a defect recognition model for recognizing a defect and determining a defect type;

S3, in a printing process of a part to be detected, collecting the molten pool image in real time, and performing online defect recognition through the defect recognition model; specifically, if a current layer has no defects, performing S4;

if a defect is recognized in the current layer, selecting whether to repair the defect according to a defect type, wherein the defect types include a short crack, a pore, a deformation, and a long crack, the short crack and the pore belong to the common defect category and the deformation and long crack belong to the serious crack category;

if a defect is identified in the current layer, selecting whether to perform defect repairing based on the defect type, wherein the step specifically includes:

acquiring a type, output by the defect recognition model, of each defect and a corresponding defect confidence level in real time;

if the defect type contains a serious defect, directly ending printing;

if all defect types are common defects, computing a final defect confidence level of the common defects:

$$FCL = w \times N + (1 - w) \times M$$

wherein FCL is a final defect confidence level, w is a weight, w∈ [0, 1], N is an average of defect confidence levels corresponding to pore defects, and M is an average of defect confidence levels corresponding to short crack defects;

determining whether the final defect confidence level is greater than a pre-set confidence threshold; if so, selecting defect repair; otherwise, performing S4 to carry out powder spreading and printing on a next layer; and if defect repair is selected, after the current layer is printed, suspending powder spreading once, predicting laser remelting parameters by adopting a pre-trained second neural network model, and performing laser remelting repairing on the defect by adopting the laser remelting parameters until the current layer has no defects; and S4, continuing to perform powder spreading and printing on a next layer, returning to S3, repeating the processes of online defect recognition and laser remelting repairing until the part to be detected is printed.

2. The SLM printing defect detection and repair method based on the deep learning network according to claim 1, wherein the defect dataset is obtained by marking a defect position and the defect type of the preprocessed molten pool image.

3. The SLM printing defect detection and repair method based on the deep learning network according to claim 1, wherein a network structure of the first neural network model is as follows: an input layer, a convolutional downsampling layer, a first CSPNet enhanced module, a second CSPNet enhanced module, a third CSPNet enhanced module, a fourth CSPNet enhanced module, a self-attention module, an efficient long-range attention network (ELAN) enhanced module, a first splicing layer, a fifth CSPNet enhanced module, a second splicing layer, a small object detection module, an eighth CSPNet enhanced module, a fifth splicing layer, a ninth CSPNet enhanced module, a sixth splicing layer, a reparameterization CSPNet enhanced layer, and an output layer which are connected successively;

the first CSPNet enhanced module, the second CSPNet enhanced module, the third CSPNet enhanced module, and the fourth CSPNet enhanced module each including a convolutional downsampling layer and a reparameterization CSPNet enhanced layer which are connected successively;

the ELAN enhanced module including a spatial pyramid pooling ELAN enhanced layer and an upsampling layer which are connected successively;

the first splicing layer being used to splice an output of the third CSPNet enhanced module to an output of the ELAN enhanced module, and input a splicing result into the fifth CSPNet enhanced module;

the second splicing layer being used to splice an output of the second CSPNet enhanced module to an output of the fifth CSPNet enhanced module, and input a splicing result into the small object detection module;

the small object detection module including a sixth CSPNet enhanced module, a third splicing layer, a seventh CSPNet enhanced module, and a fourth splicing layer which are connected successively; the third splicing layer being used to splice an output of the first CSPNet enhanced module to an output of the sixth CSPNet enhanced module, and input a splicing result into the seventh CSPNet enhanced module; the fourth splicing layer being used to splice the output of the sixth CSPNet enhanced module to an output of the seventh CSPNet enhanced module, and input a splicing result into the eighth CSPNet enhanced module;

the fifth CSPNet enhanced module and the sixth CSPNet enhanced module each including a reparameterization CSPNet enhanced layer and an upsampling layer which are connected successively;

the seventh CSPNet enhanced module and the eighth CSPNet enhanced module each including a reparameterization CSPNet enhanced layer and a convolutional downsampling layer which are connected successively;

the fifth splicing layer being used to splice an output of the reparameterization CSPNet enhanced layer of the fifth CSPNet enhanced module to an output of the eighth CSPNet enhanced module, and input a splicing result into the ninth CSPNet enhanced module; and the sixth splicing layer being used to splice the spatial pyramid pooling ELAN enhanced layer of the ELAN enhanced module to the ninth CSPNet enhanced module.

4. The SLM printing defect detection and repair method based on the deep learning network according to claim 3, wherein the self-attention module adopts a windowed self-attention mechanism or a shifted windowed multihead self-attention mechanism.

5. The SLM printing defect detection and repair method based on the deep learning network according to claim 1, wherein the training process of the second neural network model is as follows:

step a, increasing laser power and reducing a scanning speed on the basis of standard printing parameters to obtain a plurality of groups of adjusted laser printing parameters;

step b, performing defect recognition and remelting repair experiments multiple times, wherein the process of each experiment is as follows:

step b1, judging whether the current layer has a defect through the defect recognition model, and if there is no defect in the current layer, performing step c; and if there is a defect in the current layer, recording a current defect type and a corresponding final defect confidence level as a defect type and a final defect confidence level FCL1 before the repair;

step b2, if the final defect confidence level FCL1 before the repair exceeds a preset confidence level threshold, suspending powder spreading once, selecting one group of adjusted laser printing parameters to perform laser remelting repairing, computing a final defect confidence level FCL2 after the repair, and computing a confidence level change speed V according to the final defect confidence levels before and after the repair, $$V = (FCL1 - FCL2)/t,$$

wherein t is a time interval; and step b3, returning to step b1, repeating the processes of defect recognition and remelting repair until the current layer has no defects;

step c, continuing to perform the next layer of printing, and repeating the defect recognition and remelting repair experiments in step b until each group of adjusted laser printing parameters is used at least once;

step d, screening effective data with the confidence level change speed V greater than a preset speed threshold from the plurality of groups of adjusted laser printing parameters, and constructing a repair dataset by using the final defect confidence level FCL1 and the confidence level change speed V before the repair of each group of effective data as sample characteristics, and the adjusted laser printing parameters as sample labels; and step e, training the second neural network model through the repair dataset to obtain a defect repair model.

6. The SLM printing defect detection and repair method based on the deep learning network according to claim 5, wherein the step of predicting the laser remelting parameters by adopting the pre-trained second neural network model, and performing the laser remelting repair on the defect by adopting the laser remelting parameters until the current layer has no defects specifically comprises:

step A, acquiring a defect type of the current layer and a corresponding final defect confidence level, and setting an initial confidence level change speed;

step B, inputting the final defect confidence level and the confidence level change speed into the defect repair model, and outputting laser remelting parameters;

step C, performing one laser remelting repair on the defect of the current layer by adopting the laser remelting parameters;

step D, collecting and inputting the molten pool image after the repair obtained at step C into the defect recognition model, judging whether a defect exists, and if there is no defect, ending the process of the laser remelting repair; and if there is a defect, acquiring the final defect confidence level after the repair, and updating the confidence level change speed; and step E, returning to step B, and repeating the processes of laser remelting repair and online defect recognition until the defect recognition model recognizes that the current layer has no defects.

7. An electronic device, comprising: at least one processor, at least one memory, a communication interface, and a bus;

the processor, the memory, and the communication interface complete being in communication with one another through the bus;

the memory storing a program instruction that can be executed by the processor, and the processor invoking the program instruction to realize the method as defined in any one of the claims 1-6.

8. A non-transitory computer-readable storage medium, being capable of storing computer instructions, wherein the computer instructions enable a computer to implement the method as defined in any one of the claims 1-6.

* * * * *